US009516885B2

(12) United States Patent
Wang et al.

(10) Patent No.: US 9,516,885 B2
(45) Date of Patent: *Dec. 13, 2016

(54) COMPOSITION AND PROCESS FOR BAKED FOOD PRODUCTS TO IMPART THE SENSORIAL ATTRIBUTES OF FRIED FOOD PRODUCTS

(71) Applicant: Board of Trustees of the University of Arkansas, Little Rock, AR (US)

(72) Inventors: Ya-Jane Wang, Fayetteville, AR (US); Sarah Purcell, Houston, TX (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/962,823

(22) Filed: Dec. 8, 2015

(65) Prior Publication Data

US 2016/0088848 A1    Mar. 31, 2016

Related U.S. Application Data

(63) Continuation of application No. 12/769,294, filed on Apr. 28, 2010, now Pat. No. 9,220,282.

(Continued)

(51) Int. Cl.
*A21D 10/04* (2006.01)

(52) U.S. Cl.
CPC ............ *A21D 10/04* (2013.01); *A23P 20/12* (2016.08); *A23V 2002/00* (2013.01)

(58) Field of Classification Search
CPC ...... A21D 6/00; A21D 10/045; A21D 10/005; A21D 10/00; A21D 10/04; A23L 1/0055; A23L 1/0047; A23L 1/005; A23V 2002/00; A23V 2200/22; A23V 2200/224; A23V 2250/5118; A23P 20/10

(Continued)

(56) References Cited

U.S. PATENT DOCUMENTS 3,843,827 A    10/1974  Lee et al.
3,852,501 A    12/1974  Fazzina et al.

(Continued)

FOREIGN PATENT DOCUMENTS

JP    2005185122    7/2005

OTHER PUBLICATIONS

Resistant starch (RS) in battered fried products: Functionality and high-fibre benefit; Food Hydrocolloids. vol. 22, Issue 4, Jun. 2008, pp. 543-549.

(Continued)

*Primary Examiner* — Erik Kashnikow
*Assistant Examiner* — Lela S Williams
(74) *Attorney, Agent, or Firm* — Crowe & Dunlevy, P.C.

(57) ABSTRACT

A composition and process for cooked food products is provided to impart the sensorial attributes of fried food products. The composition is in the form of a batter coating, either powdered or wet, which is applied to a food product, and when cooked, has the taste, texture and appearance of a fried food product. The batter coating includes at least an enzyme-modified starch or flour or other starch-containing material having oil absorbing capabilities. The enzyme-modified starch is plated with a liquid cooking oil in order to bring the liquid cooking oil into the process, and the batter coating retains the incorporated liquid cooking oil during processing to impart a fat fried texture, appearance and taste to the cooked food product.

20 Claims, 1 Drawing Sheet

Related U.S. Application Data

(60) Provisional application No. 61/173,452, filed on Apr. 28, 2009.

(58) Field of Classification Search
USPC ......... 426/99, 289, 290, 296, 555, 652, 496, 426/549, 554, 302, 503, 422
See application file for complete search history.

(56) References Cited

U.S. PATENT DOCUMENTS

| | | |
|---|---|---|
| 4,068,009 A | 1/1978 | Rispoli et al. |
| 4,199,603 A | 4/1980 | Sortwell, III |
| 4,330,566 A | 5/1982 | Meyer et al. |
| 4,356,202 A | 10/1982 | Todd |
| 4,496,601 A | 1/1985 | Rispoli et al. |
| 4,588,600 A | 5/1986 | Suderman |
| 4,675,197 A | 6/1987 | Banner et al. |
| 4,943,438 A | 7/1990 | Rosenthal |
| 4,985,082 A | 1/1991 | Whistler |
| 5,445,950 A | 8/1995 | Kobayashi et al. |
| 5,676,994 A | 10/1997 | Eskins et al. |
| 5,919,486 A | 7/1999 | Ishii et al. |
| 5,935,826 A | 8/1999 | Blue et al. |
| 6,174,559 B1 | 1/2001 | Shulman et al. |
| 6,946,148 B2 | 9/2005 | Bazin et al. |
| 7,226,760 B2 | 6/2007 | Bazin et al. |
| 9,220,282 B2 * | 12/2015 | Wang ............... A23L 1/005 |
| 2005/0214432 A1 | 9/2005 | Belmar et al. |
| 2007/0042473 A1 | 2/2007 | Bazin et al. |
| 2010/0272871 A1 | 10/2010 | Wang et al. |
| 2010/0310712 A1 | 12/2010 | Ashourian et al. |

OTHER PUBLICATIONS

Recent developments in coating batters, Trends in Food Science & Technology, vol. 14, Issue 10, Oct. 2003, pp. 399-407.
Stable Starch-Lipid Compositions Prepared by Stem Jet Cooking, George Fanta and Kenneth Eskins, Carbohydrate Polymers 28 (1995) 171-175, Elsevier Science Limited.
Flavor Chemistry and Technology, Heath, Henry B., AVI Publishing Company, Connecticut 1986.
Food Chemistry, Third Edition, Fennema, Owen R., Marcel Dekker Inc., New York 1996.

* cited by examiner

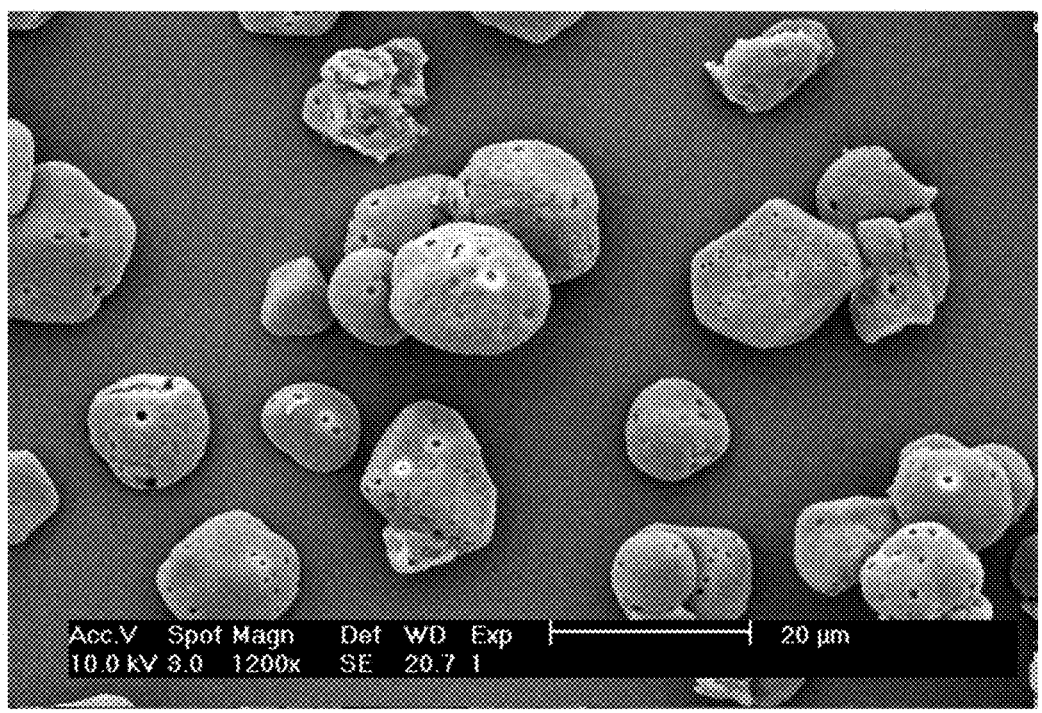

COMPOSITION AND PROCESS FOR BAKED FOOD PRODUCTS TO IMPART THE SENSORIAL ATTRIBUTES OF FRIED FOOD PRODUCTS

CROSS REFERENCE TO RELATED APPLICATIONS

This application claims priority to U.S. patent application Ser. No. 12/769,294, filed Apr. 28, 2010, which claims the benefit of U.S. Provisional Patent Application Ser. No. 61/173,452, filed Apr. 28, 2009, both of which are incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates to a composition and process for cooked food products to impart the sensorial attributes of fried food products, and more particularly to a composition in the form of a batter coating, either powdered or wet, which is applied to a food product, and when cooked, has the taste, texture and appearance of a fried food product. The batter coating includes at least an enzyme-modified starch or flour or other starch-containing material having oil absorbing capabilities. The enzyme-modified starch is plated with a liquid cooking oil in order to bring the liquid cooking oil into the process, and the batter coating retains the incorporated liquid cooking oil during processing to impart a fat fried texture, appearance and taste to the cooked food product.

2. Description of the Related Art

Recently the subject of obesity has become an increasingly problematic topic. In the United States alone, the percentage of overweight adults (age 20-74) has increased from 15.0% to 32.9% in the last twenty-three years. (CDC 2007). This increase however is not limited to adults alone. Childhood obesity has climbed significantly; 17.4% of all children ages 12-19 and 18.8% of children within 6-11 years are obese. Even at ages 2-5 years, 13.9% of children are classified as obese. (CDC 2007). Fast food has been continuously targeted for causing obesity. However, despite this claim, the numbers entering fast food establishments have sustained due to the convenience factor. Nevertheless, consumers have begun to demand more "healthy menu options." This demand has shown to be desirable; salads, fruit, and low-fat options are now offered on all national chain fast food menus.

Fried food products, particularly meats, poultry, pork, fish, vegetables, fruits, cheeses and the like, are usually prepared by coating them in a batter and/or a dry mix, such as breading, and subsequently fat-frying the coated food product. Bone-in and boneless fried chicken are especially popular and are typically prepared by batter-coating the chicken and deep fat-frying the coated chicken. According to McDonald's® menu, a 6-piece chicken McNugget® has 250 calories with 130 calories from fat. The fat-frying process is the primary contributor of the chicken nuggets' high fat content, and thus, the nutritional value of chicken nuggets can be improved by eliminating the fat-frying process. However, fat-frying imparts several critical food product functionalities, such as setting the batter coating to the food product, developing texture and color, and providing mouth-feel and flavor. These are all desirable characteristics that consumers enjoy regarding fried food products, which are often lost when the food products are baked. The food industry has yet to duplicate all of the unique characteristics of fried food products with a baking process.

While existing processes improve the attributes of baked food products to resemble those of fried food products by incorporating shortening, fluid shortening, porous bread crumbs with oil sprayed on the surface, and the combination of farinaceous material, shortening and starch derivatives, there remain opportunities to further improve upon the characteristics of coated and baked food products so as to render one or more of these characteristics more similar to the characteristics of fried food products.

It is therefore desirable to provide an improved composition and process for cooked food products to impart the sensorial attributes of fried food products.

It is further desirable to provide a composition in the form of a batter coating having at least an enzyme-modified starch or flour or starch-containing material plated with a liquid cooking oil that is applied to a food product and a process where the coated food products, when cooked, have the taste, texture and appearance of fried food products.

It is still further desirable to provide a composition and process that will benefit all fried, coated food products by significantly reducing their fat content while maintaining sensorial attributes.

It is yet further desirable to provide a composition and process for cooked food products to impart the sensorial attributes of fried food products that can be incorporated into any food product without any modification to the existing processes in the food industry.

It is yet further desirable to provide a composition and process for cooked food products to impart the sensorial attributes of fried food products that utilizes a powdered or wet batter coating with starch derivatives with liquid cooking oil incorporated therein to better immolate the texture and mouth-feel of fried food products for baked food products.

Because of the health concerns related to the usage of trans fat, such as from shortening and/or saturated fat, it is yet further desirable to provide a composition and process for cooked food products to impart the sensorial attributes of fried food products that incorporate liquid cooking oil rather than a trans fat to impart a fat fried texture, appearance, and taste to baked food products.

It is still further desirable to provide a composition and process for cooked food products to impart the sensorial attributes of fried food products that will benefit the food industry by utilizing ingredients in a new and functional way, and thus providing the food industry better tasting, healthier cooked food products.

Other advantages and features will be apparent from the following description and from the claims.

SUMMARY OF THE INVENTION

In general, in a first aspect, the invention relates to a batter coating composition for a cooked food product to impart the sensorial attributes of a fried food product. The batter coating composition includes an ungelatinized, enzyme-modified starch, an ungelatinized, enzyme-modified flour or an ungelatinized, enzyme-modified starch-containing material plated with a liquid cooking oil at a starch-to-oil weight ratio of up to about 2:1.

In general, in a second aspect, the invention relates to a process for preparing a batter coating for a cooked food product. The process includes plating a porous, enzyme-modified starch, flour or starch-containing material with a liquid cooking oil, such as at a starch-to-oil weight ratio of up to about 2:1. The plated, enzyme-modified starch, flour or starch-containing material is mixed a flour, and the batter coating is prepared.

In general, in a third aspect, the invention relates to a process for preparing to a cooked food product having the sensorial attributes of a fried food product. The process includes coating a food product with a batter coating formed from a mixture of a flour and a porous, ungelatinized, enzyme-modified starch-containing material that is plated with a liquid cooking oil at a starch-to-oil weight ratio of up to about 2:1. After the food product is coated, the cooked food product is prepared.

The batter coating provided herein may further include approximately equal parts by weight of the flour and the enzyme-modified starch, flour or starch-containing material, and approximately equal parts by weight of a salt, a leavening agent and a gluten. More particularly, the batter coating can include approximately 49% by weight of the flour, approximately 44% by weight of the enzyme-modified starch, flour or starch-containing material, approximately 3% by weight of the salt, approximately 2% by weight of the leavening agent, and approximately 2% by weight of the gluten. In addition, the batter coating can be hydrated with water on a 2:1 wet-to-dry ratio to form a wet batter coating.

The liquid cooking oil that is absorbed into and plates the porous enzyme-modified starch, flour or starch-containing material can be olive oil, palm oil, soybean oil, canola oil, pumpkin seed oil, corn oil, sunflower oil, safflower oil, peanut oil, grape seed oil, avocado oil, sesame oil, argan oil or rice bran oil. The food product can be beef, pork, lamb, poultry, fish, fruit, cheese or vegetable. Moreover, the food product may be prepared by steam cooking, baking or a combination thereof.

BRIEF DESCRIPTION OF THE DRAWINGS

FIG. 1 is a scanning electron micrograph illustrating the morphology of an enzyme-modified starch in accordance with an illustrative embodiment of the composition and process for baked food products to impart the sensorial attributes of fried food products disclosed herein.

DETAILED DESCRIPTION OF THE INVENTION

The compositions and processes discussed herein are merely illustrative of specific manners in which to make and use this invention and are not to be interpreted as limiting in scope.

While the compositions and processes have been described with a certain degree of particularity, it is to be noted that many modifications may be made in the details of the contents and the arrangement of the compositions and processes without departing from the spirit and scope of this disclosure. It is understood that the compositions and processes are not limited to the embodiments set forth herein for purposes of exemplification.

A composition and process for baked food products to impart the sensorial attributes of fried food products is provided herein. The composition is in the form of a batter coating, either powdered or wet, which is applied to a food product, and when baked, has the taste, texture and appearance of a fried food product. The batter coating includes at least an enzyme-modified starch or flour or other starch-containing material having oil absorbing capabilities. The enzyme-modified starch is plated with a liquid cooking oil in order to bring the liquid cooking oil into the process, and the batter coating retains the incorporated liquid cooking oil during processing to impart a fat fried texture, appearance and taste to the baked food product.

Referring now to the figures, a native starch may be used for enzymatic hydrolysis in the composition and process provided herein. After enzymatic hydrolysis, depending on the degree of hydrolysis, the native starch has a porous structure, as shown in FIG. 1 of a scanning electron micrograph of the morphology of the enzyme-modified starch utilized in the composition and process. The porous structure of the enzyme-modified starch allows for the incorporation of the liquid cooking oil while maintaining its flowable characteristics. The enzyme-modified starch may be Pure-Dent® B730 (Grain Processing Company, Muscatine, Iowa), described in U.S. Pat. No. 6,946,148 (the "'148 Patent"), which is specifically incorporated herein by reference. The '148 Patent describes the enzyme-modified, porous starch granule prepared from enzymatic hydrolysis. PureDent® B730, the commercial enzyme-modified, porous corn starch of the '148 Patent, can absorb liquid cooking oil of up to about 50% of the starch weight and still maintain good flow characteristics.

Examples 1 and 2 below use the enzyme-modified starch Pure-Dent® B730 in the exemplified batter coating formations of the composition and process for baked food products to impart the sensorial attributes of fried food products. Pure-Dent® B700, used in Example 3, is an unmodified, native corn starch from Grain Processing Company and is used as a control. Example 4 below incorporates 100% all-purpose flour and is used as a baseline. In all the examples below, boneless, skinless chicken nuggets were used as the food product for purposes of exemplification, but should not be considered limiting in scope. It is understood that the composition and process disclosed herein can be incorporated into any food product, such as meat, poultry, fish, fruits, cheeses and/or vegetables, without modification to existing processes utilized in the food industry. It is further understood that the flour may be a wheat, corn, rice or soy flour, and that the liquid cooking oil can be any type of vegetable oil, such as olive oil, palm oil, soybean oil, canola oil, pumpkin seed oil, corn oil, sunflower oil, safflower oil, peanut oil, grape seed oil, avocado oil, sesame oil, argan oil or rice bran oil, without departing from the spirit and scope of the composition and process for baked food products to impart the sensorial attributes of fried food products disclosed herein.

EXAMPLE 1

A batter coating having an enzyme-modified starch incorporated therein was prepared having the following formulation:

| Ingredient | % by Weight |
| --- | --- |
| Flour | 49 |
| Enzyme-modified Starch | 44 |
| Salt | 3 |
| Leavening | 2 |
| Gluten | 2 |

The batter coating above was formulated by mixing flour, B730 enzyme-modified starch, salt, a leavening agent and gluten in the proportions prescribed above. The chicken nugget was battered (hydrated 2:1, wet:dry) and breaded with the batter coating. The amount of the batter coating stuck to the chicken nugget (the "pick-up rate") was determined by weighing the coated chicken nugget and comparing this weight to the original weight of the uncoated chicken nugget substrate. The batter coating of Example 1 resulted in a pick-up rate of approximately 10.2%. The batter coating of Example 1 also resulted in a uniform coating having a desired appearance; however, the pick-up rate was relatively low and the batter coating was bland to taste.

EXAMPLE 2

A batter coating comprised of an enzyme-modified starch plated with safflower oil was prepared having the following formulation:

| Ingredient | % by Weight |
| --- | --- |
| Flour | 49 |
| Enzyme-modified Starch plated with Safflower Oil | 44 |
| Salt | 3 |
| Leavening | 2 |
| Gluten | 2 |

The batter coating of Example 2 was formulated similarly to the batter coating of Example 1 but the enzyme-modified starch was plated with a liquid cooking oil. In particular, about two (2) grams of the enzyme-modified corn starch, B730, was mixed with about one (1) gram of liquid safflower oil. Safflower oil, being one type of flavorless and colorless vegetable cooking oil, was used as the liquid cooking oil in Example 2, but the composition and process disclosed herein should not be so limited in scope. Again, the chicken nugget was battered (hydrated 2:1, wet:dry) and breaded with the batter coating. The batter coating of Example 2 resulted in a pick-up rate of approximately 15.5%. Further, the batter coating of Example 2 was semi-uniform, browned slightly, and was gelatinized with an initial steam cook. In addition, the pick-up rate of the batter coating of Example 2 having the liquid cooking oil incorporated therein was greater than the pick-up rate of the batter coating of Example 1 without any liquid cooking oil incorporated therein, and the fatty-taste of the batter coating of Example 2 came through in the baked food product.

EXAMPLE 3

A control batter coating comprised of an unmodified corn starch plated with liquid cooking oil was prepared having the following formulation:

| Ingredient | % by Weight |
| --- | --- |
| Flour | 49 |
| Unmodified Corn Starch plated with Safflower Oil | 44 |
| Salt | 3 |
| Leavening | 2 |
| Gluten | 2 |

The batter coating of Example 3 was formulated by mixing flour, B700 unmodified corn starch, salt, a leavening agent and gluten in the proportions prescribed above. Approximately two (2) grams of the B700 native corn starch was plated with about one (1) gram of safflower oil. The chicken nugget was battered (hydrated 2:1, wet:dry) and breaded with the batter coating, resulting in a pick-up rate of approximately 19.7%. The batter coating of Example 3 was not uniform in appearance due to the ungelatinized pellets of starch and oil. Despite the high pick-up rate, the fatty-taste did not come through in the baked food product but instead was overwhelmed by the uncooked, starchy perception.

EXAMPLE 4

A baseline batter coating incorporating 100% all-purpose flour was prepared having the following formulation:

| Ingredient | % by Weight |
| --- | --- |
| Flour | 93 |
| Salt | 3 |
| Leavening | 2 |
| Gluten | 2 |

The batter coating of Example 4 was formulated by mixing 100% all-purpose flour, salt, a leavening agent and gluten in the proportions prescribed above. The chicken nugget was battered (hydrated 2:1, wet:dry) and breaded, resulting in a pick-up rate of approximately 10.4%. The batter coating of Example 4 varied as expected by flour and was semi-uniform after the chicken nugget is fully baked. The chicken nugget became tacky and unmanageable in texture during coating and steam cooking thereof. Further, no flavor profile was perceived from the batter coating itself.

Therefore, the composition and process utilizing the batter coating of Example 2 resulted in baked chicken nuggets having more attributes of fried chicken nuggets, namely a better in mouth-feel than baked chicken nuggets than other batter coating formulations based on a sensory evaluation. Therefore, the composition and process for baked food products to impart the sensorial attributes of fried food products utilizing a batter coating having at least an enzyme-modified starch or other starch-containing materials plated with a liquid cooking oil improves the appearance, texture, mouth-feel and other sensorial attributes of baked food products.

Whereas, the compositions and processes have been described in relation to the drawings and claims, it should be understood that other and further modifications, apart from those shown or suggested herein, may be made within the spirit and scope of this invention.

What is claimed is:

1. A dry batter coating composition for a cooked food product to impart the sensorial attributes of a fried food product, said dry batter coating composition comprising:

an ungelatinized, enzyme-modified starch, having a porous structure plated with a liquid cooking oil in an amount of up to 50% by weight of said enzyme-modified starch.

2. The dry batter coating composition of claim 1 further comprising a flour, a salt, a leavening agent and a gluten.

3. The dry batter coating composition of claim 2 comprising:
  approximately equal parts by weight of said flour and said plated enzyme-modified starch; and
  approximately equal parts by weight of said salt, said leavening agent and said gluten.

4. The dry batter coating composition of claim 3 comprising:
  approximately 49% by weight of said flour;
  approximately 44% by weight of said plated enzyme-modified starch;
  approximately 3% by weight of said salt;
  approximately 2% by weight of said leavening agent; and
  approximately 2% by weight of said gluten.

5. The dry batter coating composition of claim 1 wherein said liquid cooking oil is a vegetable oil selected from the group consisting of olive oil, palm oil, soybean oil, canola oil, pumpkin seed oil, corn oil, sunflower oil, safflower oil, peanut oil, grape seed oil, avocado oil, sesame oil, argan oil or rice bran oil.

6. The dry batter coating composition of claim 2 wherein said flour is selected from the group consisting of wheat flour, corn flour, rice flour, or soy flour.

7. A process for preparing a batter coating for a cooked food product, said process comprising the steps of:
  1) plating a porous, enzyme-modified starch with a liquid cooking oil;
  2) mixing said plated, enzyme-modified starch and a flour; and
  3) forming said batter coating.

8. The process for preparing said batter coating of claim 7 wherein said step 1) comprises
  plating said porous, enzyme-midifed starch with said liquid cooking oil in an amount of up to 50% by weight of said enzyme-moified starch.

9. The process for preparing said batter coating of claim 8 comprising the steps of:
  1) mixing approximately equal parts by weight of said plated, enzyme-modified starch and said flour;
  2) mixing approximately equal parts by weight of a salt, a leavening agent and a gluten; and
  3) forming said batter coating.

10. The process for preparing said batter coating of claim 9 wherein said step 2) comprises mixing approximately 49% by weight of said flour and approximately 44% by weight of said plated enzyme-modified starch, and wherein said step 3) further comprises mixing approximately 3% by weight of said salt, approximately 2% by weight of said leavening agent, and approximately 2% by weight of said gluten.

11. The process for preparing said batter coating of claim 9 further comprising the step of hydrating said batter coating with water on a 2:1 wet-to-dry ratio to form a wet batter coating.

12. The process for preparing said batter coating of claim 7 wherein said liquid cooking oil is a vegetable oil selected from the group consisting of olive oil, palm oil, soybean oil, canola oil, pumpkin seed oil, corn oil, sunflower oil, safflower oil, peanut oil, grape seed oil, avocado oil, sesame oil, argan oil or rice bran oil.

13. The process for preparing said batter coating of claim 7 wherein said flour is selected from the group consisting of wheat flour, corn flour, rice flour, or soy flour.

14. A process for preparing to a cooked food product having the sensorial attributes of a fried food product, said process comprising the steps of:
  (a) coating a food product with a batter coating, wherein said batter coating comprises a mixture of a flour and a porous, ungelatinized, enzyme-modified starch; wherein said enzyme-modified starch is plated with cooking oil in an amount of up to 50% by weight said enzyme-modified starch; and
  (b) then after step (a), preparing said cooked food product from said coated food product.

15. The process of claim 14 wherein said batter coating further comprises a mixture of salt, a leavening agent and a gluten.

16. The process of claim 15 wherein said batter coating comprises approximately 49% by weight of said flour, approximately 44% by weight of said enzyme-modified starch, approximately 3% by weight of said salt, approximately 2% by weight of said leavening agent, and approximately 2% by weight of said gluten.

17. The process of claim 15 wherein said batter coating is a wet batter coating having a 2:1 wet-to-dry ratio.

18. The process of claim 14 wherein said liquid cooking oil is a vegetable oil selected from the group consisting of olive oil, palm oil, soybean oil, canola oil, pumpkin seed oil, corn oil, sunflower oil, safflower oil, peanut oil, grape seed oil, avocado oil, sesame oil, argan oil or rice bran oil.

19. The process of claim 14 wherein said food product is selected from the group consisting of beef, pork, lamb, poultry, fish, fruit, cheese or vegetable.

20. The process of claim 14 wherein said step (b) of preparing said cooked food product further comprises the step of steam cooking and/or baking said coated food product to prepare said cooked food product.

* * * * *